United States Patent [19]

Nelson

[11] Patent Number: 5,050,184
[45] Date of Patent: Sep. 17, 1991

[54] METHOD AND APPARATUS FOR STABILIZING LASER MIRROR ALIGNMENT

[76] Inventor: George A. Nelson, 2586 E. Falcon Way, Sandy, Utah 84093

[21] Appl. No.: 485,250

[22] Filed: Feb. 23, 1990

[51] Int. Cl.$^5$ .............................................. H01S 3/08
[52] U.S. Cl. .................................... 372/107; 372/87; 372/61; 372/34
[58] Field of Search ...................... 372/87, 86, 55, 61, 372/62, 65, 34, 107

[56] References Cited

U.S. PATENT DOCUMENTS

| | | | |
|---|---|---|---|
| 4,434,493 | 2/1984 | Chaffee | 372/87 |
| 4,779,284 | 10/1988 | Nissen | 372/61 |
| 4,803,697 | 2/1989 | Chaffee | 372/107 |

Primary Examiner—Léon Scott, Jr.

[57] ABSTRACT

A laser employing a dispenser cathode is provided with a tubular enclosure surrounding that cathode. The tubular enclosure serves as a support for the bore and the optical chamber on either side of the dispenser cathode and is insulated from ambient temperature conditions by a ballast reservoir housed in a jacket encircling the tubular enclosure. The jacket has peripheral sidewalls spaced apart from the tubular enclosure. Lateral end walls connect the opposite extremities of the peripheral sidewalls in a sealing engagement to the exterior of the tubular enclosure. Communication between the interior of the jacket and the interior of the tubular support is afforded through an aperture formed in the tubular support at a location remote from the dispenser cathode. Leads for the dispenser cathode are disposed in a sealing engagement through the end walls of the jacket and enter the interior of the tubular support through the aperture formed therethrough. By retaining rather than dissipating from the tubular support the heat generated by the dispenser cathode, a predictable and circumferentially uniform amount of longitudinal, temperature-related dimensional changes are induced in the tubular support, preventing cathode housing bending of the support structure between the optical chamber and the bore. This contributes to enhanced mirror alignment stability.

29 Claims, 2 Drawing Sheets

METHOD AND APPARATUS FOR STABILIZING LASER MIRROR ALIGNMENT

BACKGROUND

1. The Field of the Invention

This invention relates to lasers that use dispenser cathodes that are heated in order to function as a source of electrons with which to induce laser activity. More particularly, the present invention relates to methods and apparatus for stabilizing the mirror alignment in such lasers despite the temperature-induced dimensional changes caused in the structure of the laser adjacent to the dispensing cathode by the heat generated therein.

2. The Prior Art

The use of laser technology in all areas of human activity is on the increase. This has resulted in a demand for equipment which can produce laser energy at a reasonable cost and on a reliable basis. In all lasers, electromagnetic phenomena are used to excite atoms in an active region of the laser. The relaxation of that excitation then produces light energy at a single predictable wavelength. This light energy is then reflected back and forth through the active region in order to give a single direction to subsequently produced light energy. The result is an intense beam of highly coherent light energy which may be applied to any number of scientific, industrial, or medical purposes.

Some lasers employ dispenser cathodes, which are heated and then emit free electrons. Typically, dispenser cathodes are made of tungsten impregnated or matrix-mixed with barium. When an electrical current is passed through such an electrode, the resistance in the tungsten causes heat in the manner of an incandescent light bulb filament. Once heated, the barium impregnations in the tungsten give off free electrons. These are then directed to flow through the active region of the laser to an anode placed on the opposite side of the active region from the cathode. Passing through the active region of the laser, this stream of electrons excites the atoms of the gas therein, which in turn results in the generation of light energy.

A typical known laser of this type is shown schematically in FIG. 1, where a laser tube A can be seen to include an active region B formed longitudinally at the center of a ceramic core C. Aligned with and at opposite ends of active region B are first and second mirrors D, E, respectively. A gas in active region B produces laser energy which is reflected between first and second mirrors D, E, respectively, to develop in active region B resonant light emissions of intense and coherent qualities. In these so-called ion lasers, the gas in active region B is a rarified inert gas, such as argon, krypton, or xenon, at pressures in the range of about 0.3 torr to about 1.5 torr.

Whatever the type of gas utilized, however, laser emissions in active region B are stimulated by a flow of electrons F passing therethrough from a heated dispenser cathode G to an anode H located on opposite sides of bore C. Dispenser cathode G is comprised of an incandescent electrical conductor, such as tungsten, having embedded therein a source of free electrons, such as barium. Dispenser cathode G is heated by alternating current in secondary circuit loop I of a transformer T, and the impregnated electron source commences to boil off electrons. These electrons from dispenser cathode G are then induced to flow as a direct current through active region B to anode H under the influence of a current regulated direct current source J.

It is essential to the proper functioning of a laser, such as laser A, that the alignment of first and second mirrors D, E, respectively, be sustained. Otherwise, laser energy produced in active region B will not be consistently returned through active region B, and the coherent laser will cease to be produced. The heat generated in dispenser cathode G is problematic with regard to maintaining laser mirror alignment, because that heat causes dimensional changes in the laser structure surrounding dispenser cathode G. Such temperature-related dimensional changes, if circumferentially nonuniform, can cause bending in the structure intermediate first and second mirrors D, E, respectively. This will throw those mirrors out of alignment. Thus, it has been a longstanding problem in lasers using cathodes to grapple with the temperature-induced dimensional changes and the resulting mirror misalignment caused by cathode heating.

In the past, conventional wisdom has dictated that the structures surrounding such heated cathodes be made of a low expansion alloy material, such as Kovar TM, which is itself a combination of about 42% nickel, 14% cobalt, and 44% iron. Such material is available, for example, from the Carpenter Steel Division of Carpenter Technology of Reading, Pennsylvania, and other sources in a number of forms. Nevertheless, even such special alloys do not entirely eliminate temperature-induced dimensional changes in the structures about a heated cathode.

It has, accordingly, further become the standard practice to attempt to cool by convection or induced contact with air at ambient or lower temperature conditions the structure in which such heated dispenser cathodes are located. In some instances, the immediate housing surrounding the heated dispenser cathode is provided with cooling fins and the like in order to effect the maximum possible removal of heat therefrom. It was thus the goal to maintain the cathode housing at the lowest possible temperature. This strategy to solving the problem of laser mirror alignment relied on minimizing the magnitude of temperature-induced dimensional changes. With cathode housings exposed to cooling mediums at ambient or lower temperatures, the housings themselves were maintained in a temperature range of about 130° C. to about 400° C.

Typically, ion lasers employing dispenser cathodes require a reserve volume, or ballast, of the gas utilized in active region B for generating laser phenomena. In the low pressure setting of the ion laser this reserve constituted a small mass which was allowed to communicate freely with active region B. Typically, in order to permit the housing of the heated cathode used with such lasers to be directly contacted by a coolant at ambient or lower temperature conditions, the ballast was housed in a reservoir which was longitudinally separated from the cathode housing. In this way, the physical presence of the volume of the ballast did not impede the cooling effect of the ambient surroundings on the cathode housing.

Nevertheless, such efforts to ensure mirror alignment in lasers using dispenser cathodes have not proved satisfactory. Mirror misalignment is a common operating problem, requiring the continual resetting of mirror orientations in lasers to ensure their functioning. The use of cooling fins on the exterior of the cathode housings in such lasers has added complexity to the devices, and the need to expose the cathode housing to a cooling fluid at ambient or lower temperature conditions has limited the freedom of design available for other aspects and the overall configuration of lasers. Until the present invention, no satisfactory approach had been achieved to the maintenance of mirror alignment in lasers utilizing a heated dispenser cathode intermediate therebetween. This problem is particularly acute in the smaller, low-cost lasers finding ever wider use in industry, research, and medicine. In shorter lasers the length of the portion devoted to housing the dispenser cathode becomes a significant fraction of the total overall length. Under such circumstances temperature-related dimensional changes in the overall device become extremely significant.

BRIEF SUMMARY AND OBJECTS OF THE INVENTION

One object of the present invention is an improved laser of the type that utilizes a dispenser cathode.

Another object of the present invention is a laser as described above exhibiting enhanced mirror alignment stability.

Yet another object of the present invention is a laser as described which is simpler in its manner of coping with heat-induced dimensional changes than prior lasers employing dispenser cathodes.

Yet another object of the present invention is a laser as described having increased reliability and reduced operating costs than those previously available.

Still another object of the present invention is to create in a laser employing a dispenser cathode enhanced design freedom for individual laser components and for the overall laser layout.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an enclosure is provided for the dispensing cathode of a laser comprising a tubular cathode housing that supports or carries at the opposite ends thereof the structures of the laser that are adjacent to and on opposite sides of the dispenser cathode. According to one aspect of the present invention, means are provided for insulating the cathode housing from direct contact with ambient temperature conditions and at the same time for enabling unrestrained longitudinal, temperature-related dimensional changes in the cathode housing caused by heat from the dispenser cathode.

In one embodiment of the invention, such a means for insulating and enabling comprises a jacket encircling the cathode housing. The jacket is sealed to the exterior of the cathode housing, and an aperture is formed through a wall of the cathode housing at a location interior to the jacket. The jacket itself comprises peripheral sidewalls spaced apart from and encircling the exterior of the cathode housing in combination with lateral end walls interconnecting the extremities of the sidewalls to the exterior of the cathode housing. Preferably, at least one of the end walls is thinner than the sidewalls, and the cathode housing and jacket have circular cross-sections which may be concentrically disposed. Electrical leads for the dispenser cathode are sealingly disposed through one of the end walls and enter the interior of the cathode housing through the aperture therein.

The tubular cathode housing functions as the support structure between the components of the laser located on opposite sides of the dispenser cathode. Typically, this include the bore containing the active region of the laser on one side and the optical chamber on the other. By the arrangement described, that support structure, rather than being cooled in order to minimize longitudinal, temperature-related dimensional changes therein, is insulated by the encircling jacket from any cooling contact with ambient temperature conditions. In this manner, the cathode housing heats to a steady state temperature and experiences a predetermined, but nevertheless circumferentially uniform amount of temperature-induced dimensional changes. This contributes to maintaining mirror alignment.

The structure of the jacket, with at least one end wall thereof being relatively thinner than the rest of the jacket, permits longitudinal, temperature-related dimensional changes to occur in the tubular cathode housing, while that thinner end wall of the jacket is displaced outwardly therewith in diaphragm fashion. The jacket thus places no constraints on the longitudinal dimensional changes of the cathode housing, but by insulating that housing from contact with ambient temperature conditions contributes to circumferentially uniform heating therein. This ensures that such temperature-related dimensional changes do not result in bending of the laser structure or the resultant misalignment of the mirrors at the opposite ends thereof.

In a preferred embodiment of the invention, the jacket contains an inert gas, such as argon, krypton, or xenon, at a pressure in the range of from about 0.3 torr to about 1.5 torr. The cathode housing itself and the jacket thereabout are typically comprised of a low expansion alloy material, such as Kovar TM, while the dispensing cathode is a structure comprised of tungsten impregnated with barium.

In the context of specific laser structures, the present invention provides for a laser comprising a bore having formed longitudinally therethrough an active region in which to induce laser discharge, an optical chamber aligned with and spaced apart from the bore, a first mirror mounted at the end of the active region opposite from the optical chamber, a second mirror mounted at the end of the optical chamber opposite from the bore, a dispenser cathode disposed between the active region and the optical chamber, and an anode mounted between the first mirror and the active region. A tubular support enclosing the dispenser cathode carries at the opposite ends thereof the bore and the optical chamber, respectively. A ballast reservoir is disposed surrounding the tubular support, and means are provided for communicating the contents of the ballast reservoir with the interior of the tubular support. In one embodiment of the invention this takes the form of an aperture through a wall of the tubular support at a location internal to the ballast reservoir, but remote from the dispenser cathode.

The structure of the present invention may also be described and claimed in terms of a ballast housing for use with a dispenser cathode in a laser, or a structure for stabilizing the alignment of the mirrors of a laser located on opposite sides of a dispenser cathode.

The present invention also includes a method for stabilizing mirror alignment in a laser employing a dispenser cathode. That method comprises the steps of disposing the dispenser cathode in a temperature stabilization tube which carries at the opposite ends thereof the structures of the laser adjacent to and on opposite sides of said dispenser cathode. The temperature stabilization tube is insulated from direct contact with ambient temperature and, after coupling the dispenser cathode to a source of electric power, is permitted unrestrained longitudinal, temperature-related dimensional changes due to heat from the dispenser cathode.

The step of insulating the temperature stabilization tube comprises the steps of surrounding the temperature stabilization with a ballast housing, placing the interior of the temperature stabilization tube in communication with the interior of the ballast housing, evacuating the ballast housing and temperature stabilization tube and thereafter introducing an inert gas at low pressure thereinto. The interior of the temperature stabilization tube is placed in communication with the interior of the ballast housing by forming an aperture through the temperature stabilization tube at a location interior to the ballast housing.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
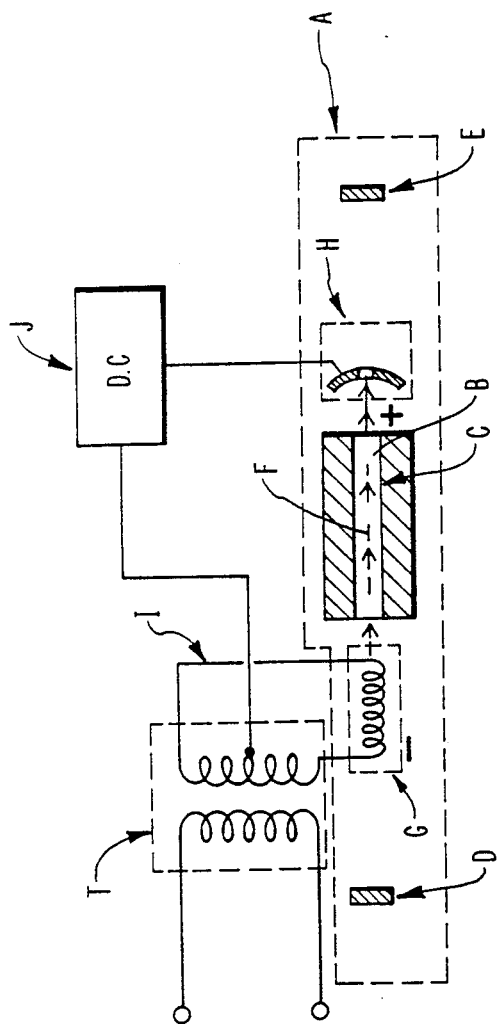
FIG. 1 is a schematic illustration of the common components of a laser employing a dispenser cathode.
Figure 2:
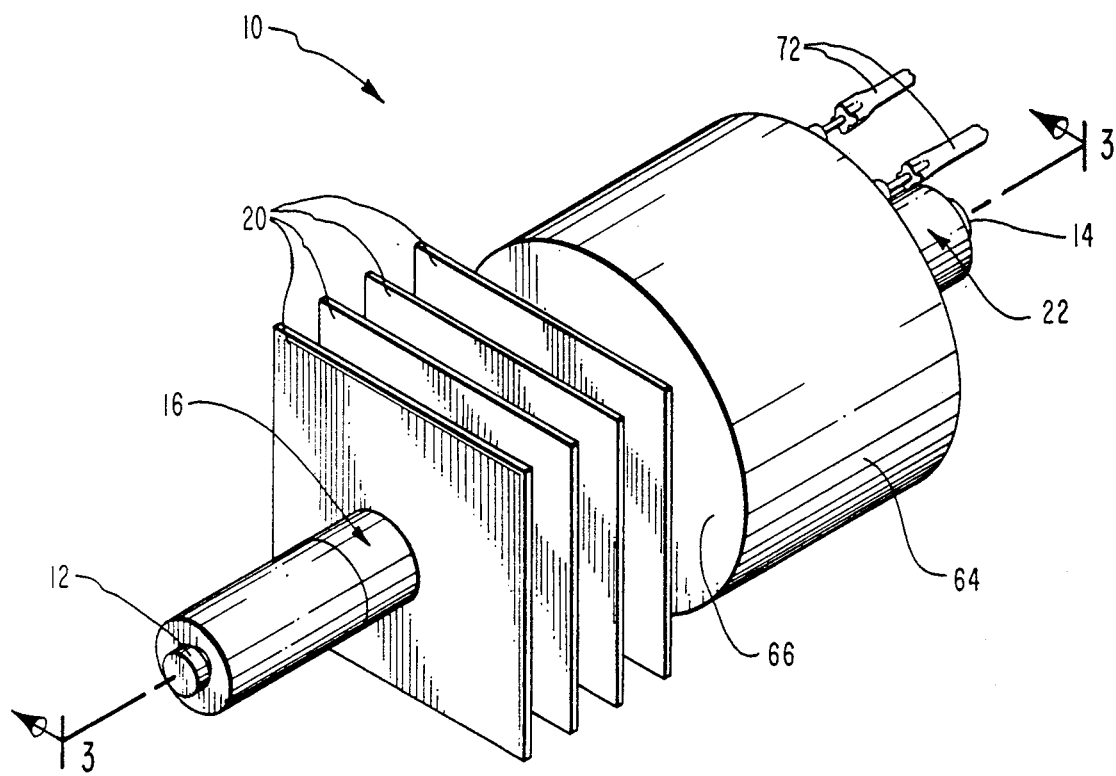
FIG. 2 is a perspective view of one embodiment of a laser employing the teachings of the present invention having internally mounted mirrors and a dispenser cathode.
Figure 3:
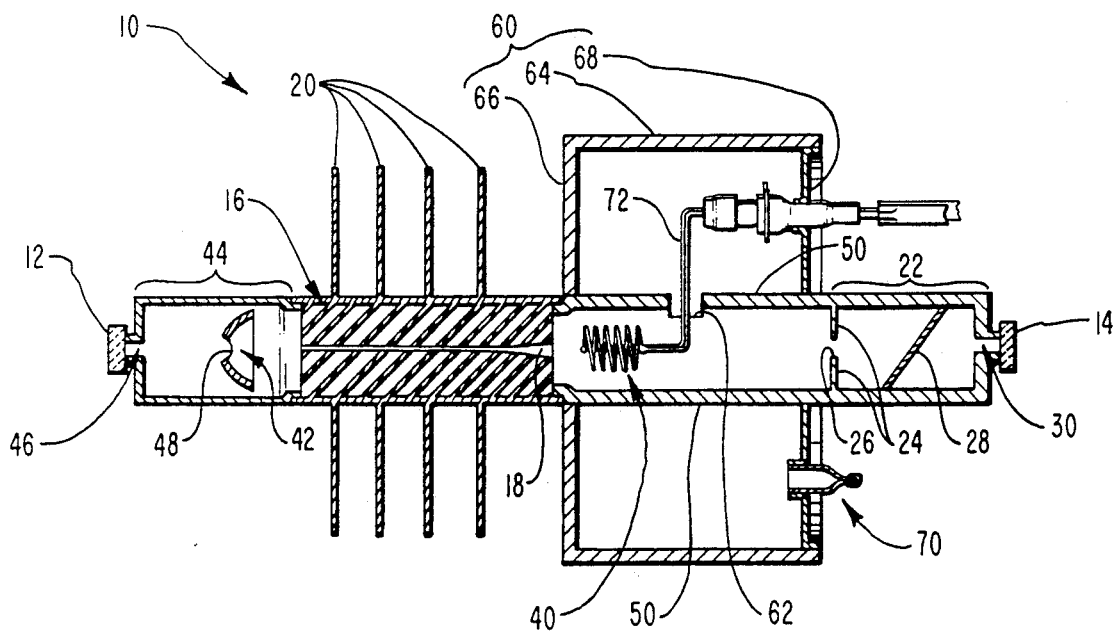
FIG. 3 is a cross-sectional elevation view of the laser shown in FIG. 2 taken along section line 3—3 therein.

Shown in FIGS. 2 and 3 taken together is one embodiment of a laser tube 10 incorporating teachings of the present invention to stabilize the alignment of first and second mirrors 12, 14 located at the opposite ends thereof. By virtue of first and second mirrors 12, 14, respectively, being mounted directly on laser tube 10, the laser in which laser tube 10 is incorporated is referred to as one having internally mounted mirrors. Although laser tube 10 will incorporate the circuitry and major features illustrated in FIG. 1 in relation to laser tube A, new reference characters differing from those used in relation to laser tube A will be used in relation to laser tube 10.

Generally speaking, laser tube 10 comprises a ceramic bore 16 having formed longitudinally therethrough a capillary 18 which houses the active region of laser tube 10. The exterior of bore 16, is provided with a plurality of cooling fins 20 which in combination with a flow of usually gaseous coolant at ambient or lower temperatures removes heat from bore 16 resulting from laser discharge in the active region in capillary 18. Although not shown, the required flow of coolant is usually ensured through the use of a forced flow mechanism external to laser tube 10 itself.

Laser tube 10 also includes an optical chamber 22 aligned with but spaced apart from capillary 18 in bore 16. As best understood by reference to FIG. 3, optical chamber 22 comprises a cylindrical space defined at the end thereof closest to bore 16 by an optical membrane 24 having centrally formed therein a laser light aperture 26. Within optical chamber 22 disposed generally normal to the longitudinal axis of laser tube 10 is a polarizing, or Brewster, window 28 comprised of quartz. At the end of optical chamber 22 on the opposite side of polarizing window 28 is a mount and adjustment mechanism 30 for second mirror 14. Laser light aperture 26 and second mirror 14 are disposed in axial alignment with capillary 18, whereby laser emissions from capillary 18 reaching second mirror 14 through laser light aperture 26 are intended to be reflected back through laser light aperture 26 into capillary 18 parallel to the longitudinal axis thereof.

A dispenser cathode 40 is disposed between the active region in capillary 18 and optical chamber 22. Dispenser cathode 40 is comprised of a material, such as tungsten, impregnated or matrix-mixed with an electron emitter, such as barium. When electricity passes through dispenser cathode 40, the resistance component thereof in the form of tungsten, heats to incandescence, reaching temperatures in the range of from about 1100° C. to about 1200° C. This in turn stimulates the emission of free electrons from the barium. These free electrons are then induced to travel from dispenser cathode 40 through the active region housed in capillary 18 by a dish-shaped anode 42, located at the end of capillary 18 opposite from dispenser cathode 40.

Anode 42 is housed in an anode enclosure 44. At the end of anode enclosure 44 on the opposite side of anode 42 from bore 16 is a mount and adjustment mechanism 46 for first mirror 12. Anode 42 has centrally formed therein a laser light aperture 48 for permitting laser emissions from the active region in capillary 18 to reach first mirror 12. Through the proper alignment of laser light aperture 48 and first mirror 12 on the axis of capillary 18, laser light from capillary 18 passes through anode 42 and is reflected back therethrough into capillary 18 by first mirror 12.

A tubular support 50 encloses dispenser cathode 40 and carries on one end thereof optical chamber 22 and on the other end thereof bore 16. By virtue of its placement surrounding dispenser cathode 40, tubular support 50 also functions as a tubular cathode housing. Under either view, however, it should be emphasized that tubular support 50 comprises the structure of laser tube 10 that supports both optical chamber 22 and bore 16. By virtue of its location about dispenser cathode 40, tubular support 50 must absorb heat generated in dispenser cathode 40 by operation of laser tube 10. In the process, tubular support 50 undergoes substantial longitudinal, temperature-related dimensional changes. To minimize such changes, tubular support 50 is generally comprised of a low expansion alloy material, such as Kovar ™. In contrast to known devices, however, no effort is made to further minimize dimensional changes of the intermediate components of laser tube 10 located between capillary 18 and optical chamber 22 as for example by the removal of heat therefrom to maintain a low temperature. Such a prior approach has been found to result in circumferentially uneven heating, and therefore uneven expansion leading to bending, because of an inability to provide a coolant flow about these intermediate components that is reliably uniform in temperature at all circumferential locations.

Instead, in one aspect of the present invention, means are provided for insulating the cathode housing that is tubular support 50 from direct contact with ambient temperature conditions and simultaneously for enabling unrestrained longitudinal, temperature-related dimensional changes in tubular support 50 as these result from the absorption of heat generated in dispenser cathode 40. In this approach, temperature-related dimensional changes in the structure of laser tube 10 that is located between bore 16 and optical chamber 22 are not minimized, as in the prior art effort to stabilized mirror alignment. Instead, dispenser cathode 40 and tubular support 50 surrounding it are insulated from ambient temperature conditions so that tubular support 50 can reach a steady state temperature.

While this does not minimize the magnitude of temperature-related dimensional changes in tubular support 50, the changes that are produced are consistently predetermined, and more importantly, circumferentially uniform. Thus, tubular support 50 is allowed in the present invention to achieve a relatively high steady state temperature of about 600° C. Nevertheless, the corresponding expansion does not result in bending of tubular support 50 or the misalignment of first and second mirrors 12, 14, respectively. It is even possible using this technique to construct tubular support 50 of a material which is other than a low-expansion alloy. Where tubular support 50 can be maintained in a circumferentially uniform temperature state, it will theoretically make no difference whether the magnitude of expansion experienced in that structure from heating is held to a minimum. It is only significant that the expansion be circumferentially uniform.

According to the teachings of the present invention, in one explarary embodiment thereof, such a means for insulating and for enabling unrestrained longitudinal dimensional changes in tubular support 50 is provided in the form of a jacket 60 encircling tubular support 50 and an aperture 62 formed through a wall of tubular support 50 at a location interior to jacket 60. Jacket 60 comprises peripheral sidewalls 64 which are spaced apart from and encircling the exterior of tubular support 50. Interconnecting the extremities of sidewalls 64 are lateral end walls 66, 68, which serve to seal jacket 60 to tubular support 50.

Aperture 62 enables the interior of jacket 60 to communicate with the interior of tubular support 50. The interior of tubular support 50 in turn communicates through capillary 18 to the interior of anode enclosure 44 and through laser light aperture 26 and optical membrane 24 to the interior of optical chamber 22. Under normal circumstances, this interior space in laser 10 is initially evacuated and then filled with an inert gas at a low pressure, in the range of from about 0.3 torr to 1.5 torr through evacuation nipple 70.

In one aspect of jacket 60, at least one of the end walls 66, 68 is thinner than sidewall 64. In this manner, as tubular support 50 undergoes longitudinal, temperature-related dimensional changes the thinner end wall 66 or 68 bows outwardly in diaphragm fashion. This enables unrestrained longitudinal temperature-related dimensional changes in tubular support 50, while yet insulating tubular support 50 from direct contact with ambient temperature conditions. Sidewall 64 of jacket 60 is thus not in the strictest sense a structural element supporting, either bore 60, or optical chamber 22 of laser tube 10. Rather, jacket 60 is flexibly mounted on the exterior of tubular support 50 for the insulative purposes already described. Preferably, only one of end walls 66 or 68 need be thinner than the balance of the components of jacket 60, and in FIGS. 2 and 3, end wall 68, which is adjacent to optical chamber 20, is relatively thin compared to the other components of jacket 60.

As best seen in FIG. 3, electrical leads 72 for dispenser cathode 40 are sealingly disposed through end wall 68, thereby to preserve the isolation of the interior of laser tube 10 from ambient air. Furthermore, electrical leads 72 enter the interior of tubular support 50 through aperture 62 formed therein. In this manner, electrical leads 72 afford no impedance whatsoever to the longitudinal, temperature-related dimensional changes necessarily experienced in tubular support 50 due to heat emitted by dispenser cathode 40.

Jacket 60 with tubular support 50 passing through end walls 66, 68 thereof also performs as a ballast housing for enclosing a volume of inert gas which through aperture 62, capillary 18 and laser light aperture 26 is allowed to circulate in the space interior to laser tube 10. In this role, it should be noted that the resulting ballast housing encloses a ballast reservoir that is disposed surrounding tubular support 50 and provided with a means for communicating the contents of the ballast reservoir with the interior of tubular support 50. The latter takes the form, for example, aperture 62.

Nevertheless, other forms of structure for insulating tubular support 50 and communicating a ballast reservoir to the interior thereof are considered to be within the scope of the present invention. For example, a steady-state temperature in tubular support 50 could be insulated from ambient temperature conditions through conventional asbestos or fiberglass insulation, provided that a remote ballast reservoir is allowed to communicate with the interior of tubular support 50 using, for example, a tubular interconnection therebetween.

In another aspect of the embodiment of the invention illustrated in FIGS. 2 and 3, aperture 62 is formed in tubular support 15 at a location thereon remote from dispenser cathode 40. It is intended thereby to isolate within tubular support 50 all electrical phenomena emitted from dispenser cathode 40. In addition, by locating aperture 62 remote from dispenser cathode 40, the heat emanated from dispenser cathode 40 can be absorbed in a portion of tubular support 50 comprising a circumferentially uniform expanse of material. This avoids uneven absorption of heat which might occur were aperture 62 located in the region close to dispenser cathode 40.

Figure 4:
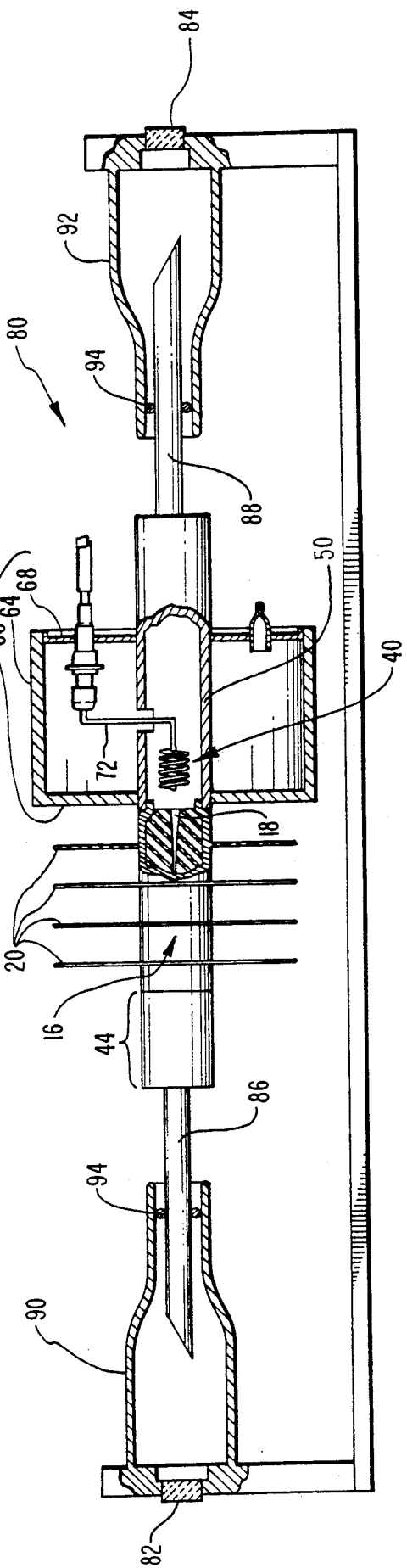
FIG. 4 is a cross-section elevational view of another embodiment of a laser employing the teachings of the present invention having externally mounted mirrors and a dispensing cathode.

Laser tube 10 has internally mounted mirrors. Nevertheless, the principles of the present invention also have applicability to lasers in which the mirrors thereof are externally mounted. Thus, by way of example and not limitation, a second embodiment of a laser tube 80 is illustrated in FIG. 4 embodying principles of the present invention. In FIG. 4, structures of laser tube 80 found in substantially identical form in laser tube 10 will be referred to using the same reference characters that were employed for those structures in relation to the embodiments thereof shown in FIGS. 2 and 3.

Accordingly, laser tube 80 can be seen to include a dispenser cathode 40 mounted at one end of a bore 16 containing a capillary 18 for housing the active region of laser tube 80. A tubular support 50 which surrounds dispenser cathode 40 and thus serves as a cathode housing, carries at one opposite end bore 16. An anode enclosure 44 is located on the end of bore 16 remote from dispenser cathode 40.

Unlike laser tube 10, however, laser tube 80 has first and second mirrors 82, 84 which are mounted externally to the mechanisms of laser tube 80 which produce light. Accordingly, the free ends of tubular support 50 and anode enclosure 44 are not closed by mirrors, as was the case with the laser tube 10. Instead, these are sealed to retain inert gas inside laser tube 80 by glass stubs 86, 88. An optical chamber is not typically required for externally mounted mirrors. The entire configuration of laser tube 80 is supported intermediate first and second mirrors 82, 84, respectively by support sleeves 90, 92, which are cantilevered from the walls in which first and second mirrors 82, 84 respectively, are mounted. The free ends of sleeves 90, 92 fit over glass stubs 86, 88, respectively with 0-rings 94 intermediate thereto.

Both laser tube 10 and laser tube 80 by embodying principles of the present invention provide a dramatically simple method and apparatus for stabilizing the mirror adjustment in a laser that employs a dispenser cathode. Rather than attempting to dissipate heat from the housing surrounding the dispenser cathode, that housing, which performs the structural function of supporting laser components on either side of the dispenser cathode, is insulated from ambient temperature conditions and permitted to undergo unrestrained longitudinal, temperature-related dimensional changes. While this practice is directly contrary to prior efforts to stabilize laser mirror adjustment in the face of temperature-induced longitudinal dimensional changes, the result has been found to be a laser exhibiting enhanced mirror alignment reliability.

In one form of the inventive device, the means for insulating the cathode housing comprises an encircling jacket having at least one longitudinal end wall thereof which is thinner than the balance of the components of the jacket. Communication is established between the jacket and the interior of the cathode housing through the formation of an aperture therethrough. It is through this aperture that the leads for the dispenser cathode enter the interior of the cathode housing.

The invention also contemplates a method for stabilizing the mirror alignment in a laser employing a dispenser cathode located intermediate an optical chamber and a bore containing the active region of the laser. Briefly stated, that method comprises the steps of disposing the dispenser cathode in a temperature stabilization tube carrying at the opposite ends thereof the optical chamber and the bore of the laser. The temperature stabilization tube is insulated from direct contact with ambient temperature while permitted to engage in unrestrained longitudinal, temperature-related dimensional changes due to heat from the dispenser cathode. When coupled to a source of electrical power, the dispenser cathode, while producing such temperature-related dimensional changes in the temperature stabilization tube does so in a very predictable, circumferentially uniform manner which does not result in bending.

In the method contemplated, the step of insulating the temperature stabilization tube comprises in one embodiment of the inventive method the steps of surrounding the temperature stabilization tube with a ballast housing, placing the interior of the temperature stabilization tube in communication with the interior of the ballast housing, evacuating the ballast housing and introducing an inert gas at low pressure thereinto. The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An enclosure for a dispenser cathode of a laser, said enclosure comprising:
    a. a tubular cathode housing enclosing therein the dispenser cathode and also enclosing therein a means for generating a laser beam along a longitudinal axis of said housing; and
    b. means for insulating a portion of the exterior of said cathode housing which contains said dispenser cathode from direct contact with ambient temperature conditions so as to permit the occurrence of unrestrained longitudinal, temperature-related dimensional changes in said cathode housing caused by heat from the dispenser cathode.

2. An enclosure as recited in claim 1, wherein said means for insulating comprises:
    a. a jacket which defines an enclosed heating space encircling said cathode housing, said jacket being sealed to the exterior of said cathode housing; and
    b. an aperture formed through a wall of said cathode housing at a location interior to said jacket, said aperture permitting communication of heat from within said cathode housing to said enclosed heating space.

3. An enclosure as recited in claim 2, wherein said jacket comprises:
    a. peripheral sidewalls spaced apart from and encircling the exterior of said cathode housing; and
    b. lateral end walls interconnecting the extremities of said sidewalls to the exterior of said cathode housing.

4. An enclosure as recited in claim 3, wherein at least one of said end walls is thinner than said sidewalls.

5. An enclosure as recited in claim 3, wherein electrical leads for the dispenser cathode are sealingly disposed through one of said end walls and enter the interior of said cathode housing through said aperture.

6. An enclosure as recited in claim 2, wherein said cathode housing and said jacket each have a circular cross-section.

7. An enclosure as recited in claim 6, wherein said circular cross-sections of said cathode housing and of said jacket are concentric.

8. An enclosure as recited in claim 2, wherein electrical leads for the dispenser cathode enter the interior of said cathode housing through said aperture.

9. An enclosure as recited in claim 2, wherein the pressure in said jacket is in the range of from about 0.3 torr to about 1.5 torr.

10. An enclosure as recited in claim 9, wherein said jacket contains an inert gas.

11. An enclosure as recited in claim 2, wherein said cathode housing and said jacket are comprised of a low-expansion alloy material.

12. A laser comprising:
  a. a bore having formed longitudinally therethrough an active region in which to induce laser discharge;
  b. an optical chamber aligned with and spaced apart from said bore;
  c. a first mirror mounted at the end of said active region opposite from said optical chamber;
  d. a second mirror mounted at the end of said optical chamber opposite from said bore;
  e. a dispenser cathode disposed between said active region and said optical chamber;
  f. an anode mounted between said first mirror and said active region;
  g. a tubular support enclosing said dispenser cathode, said tubular support carrying on the opposite ends thereof said bore and said optical chamber, respectively;
  h. means for insulating a portion of the exterior of said tubular support enclosing said dispenser cathode from direct contact with ambient temperature conditions so as to permit the occurrence of unrestrained longitudinal temperature-related dimensional changes in said tubular support caused by heat from the dispenser cathode, said means for insulating comprising a ballast reservoir containing a supply of inert gas; and
  i. means for providing flow of the supply of inert gas of said ballast reservoir to the interior of said tubular support.

13. A laser as recited in claim 12, wherein said ballast reservoir is disposed surrounding said tubular support.

14. A laser as recited in claim 13, wherein said means for communicating comprises an aperture formed through a wall of said tubular support at a location internal to said ballast reservoir.

15. A laser as recited in claim 14, wherein said aperture is formed through a portion of a wall of said tubular support remote from said dispenser cathode.

16. A laser as recited in claim 13, wherein said ballast reservoir comprises a jacket encircling said tubular support and sealed to the exterior thereof.

17. A laser as recited in claim 16, wherein said jacket comprises:
  a. peripheral sidewalls spaced apart from and encircling the exterior of said tubular support; and
  b. lateral end walls interconnecting the extremities of said sidewalls to the exterior of said tubular support, at least one of said end walls being thinner than said peripheral sidewalls.

18. A laser as recited in claim 12 wherein the one of said end walls adjacent to said optical chamber is thinner than the other of said end walls.

19. A laser as recited in claim 16, wherein said tubular support and said jacket have concentric circular cross-sections.

20. A laser as recited in claim 16, wherein the electrical leads for said dispenser cathode are sealingly disposed through one of said end walls and enter the interior of said tubular support through said aperture.

21. A laser as recited in claim 12, wherein said dispenser cathode is impregnated with barium.

22. A structure for stabilizing alignment of mirrors of a laser where the mirrors are located on opposite sides of a dispenser cathode, said structure comprising:
  a. a tubular support enclosing therewithin the dispenser cathode, said tubular support also enclosing therewithin a means for generating a laser beam along a longitudinal axis of said tubular support;
  b. an aperture formed through said tubular support; and
  c. means for insulating a portion of the exterior of said tubular support enclosing said dispenser cathode from direct contact with ambient temperature conditions so as to permit the occurrence of unrestrained longitudinal temperature-related dimensional changes in said tubular support caused by heat from the dispenser cathode, said means for insulating comprising a ballast housing comprising a jacket encircling said tubular support and being sealed to the exterior thereof, said jacket comprising:
    i. peripheral sidewalls spaced apart from and encircling the exterior of said tubular support; and
    ii. lateral end walls interconnecting the extremities of said sidewalls to the exterior of said tubular support on opposite sides of said aperture.

23. A structure as recited in claim 22, wherein said tubular support and aid peripheral sidewalls of said ballast housing have concentric circular cross-sections.

24. A structure as recited in claim 22, wherein at least one of said end walls of said ballast housing is thinner than said sidewalls thereof.

25. A method for stabilizing mirror alignment in a laser, the laser having a dispenser cathode, said method comprising the steps of:
  a. enclosing the dispenser cathode in a temperature stabilization tube;
  b. insulating at least a portion of said temperature stabilization tube from direct contact with ambient temperature;
  c. coupling the dispenser cathode to a source of electrical power; and
  d. permitting unrestrained longitudinal, temperature-related dimensional changes in said temperature stabilization tube caused by heat from the dispenser cathode.

26. A method as recited in claim 25, wherein said step of insulating comprises the steps of:
  a. surrounding said temperature stabilization tube with a ballast housing;
  b. placing the interior of said temperature stabilization tube in communication with the interior of said ballast housing;
  c. evacuating said ballast housing and temperature stabilization tube; and
  d. introducing an inert gas at low pressure into said ballast housing and temperature stabilization tube.

27. A method as recited in claim 26, wherein said ballast housing comprises a jacket encircling said cathode housing and being sealed to the exterior thereof.

28. A method as recited in claim 27, wherein said jacket comprises:
  a. peripheral sidewalls spaced apart from and encircling the exterior of said temperature stabilization tube; and
  b. lateral end walls interconnecting the extremities of said sidewalls to the exterior of said temperature stabilization tube.

29. A method as recited in claim 26, wherein said step of placing the interior of said temperature stabilization tube in communication with the interior of said ballast housing comprises the step of forming an aperture through said temperature stabilization tube at a location interior to said ballast housing.

* * * * *

UNITED STATES PATENT AND TRADEMARK OFFICE
CERTIFICATE OF CORRECTION

PATENT NO. : 5,050,184

DATED : September 17, 1991

INVENTOR(S) : GEORGE A. NELSON

It is certified that error appears in the above-identified patent and that said Letters Patent is hereby corrected as shown below:

```
Column 7, line 52, "encircling" should be --encircle--
Column 8, line 33, after "and" insert --is--
Column 8, line 36, after "for example," insert --of--
Column 12, line 23, "aid" should be --said--
```

Signed and Sealed this

Twenty-ninth Day of June, 1993

Attest:

MICHAEL K. KIRK

*Attesting Officer*  *Acting Commissioner of Patents and Trademarks*